Dec. 3, 1929. J. A. HOEGGER Re. 17,510

WALL CABINET

Original Filed Oct. 24, 1925 3 Sheets-Sheet 1

Inventor,
Joseph A. Hoegger.
By his Attorney
Ramsay Hoguet.

Dec. 3, 1929. J. A. HOEGGER Re. 17,510

WALL CABINET

Original Filed Oct. 24, 1925 3 Sheets-Sheet 2

Inventor,
Joseph A. Hoegger.
By his Attorney.
Ramsay Hoguet.

Dec. 3, 1929. J. A. HOEGGER Re. 17,510

WALL CABINET

Original Filed Oct. 24, 1925 3 Sheets-Sheet 3

Joseph A. Hoegger. Inventor,

By his Attorney.

Ramsay Hoguet.

Reissued Dec. 3, 1929

Re. 17,510

UNITED STATES PATENT OFFICE

JOSEPH A. HOEGGER, OF JERSEY CITY, NEW JERSEY

WALL CABINET

Original No. 1,646,200, dated October 18, 1927, Serial No. 64,509, filed October 24, 1925. Application for reissue filed April 13, 1929. Serial No. 354,964.

My invention relates to improvements in wall cabinets frequently used as medicine cabinets or closets. Closets of this character are generally placed in bathrooms or other places where the furnishings and fixtures are of an ornamental character and generally the medicine closet is so obviously a closet and so prominent in appearance that it appears incongruous with the other parts of the room.

My invention is intended to produce a closet of this character which, while meeting the requirements of utility and convenience, loses its apparent purpose and becomes really an embellishment to the place.

It will be seen that in structures of this kind where appearance is important, beauty is as desirable as utility.

My invention, therefore, is intended to produce a structure which, as stated, is convenient, which is strong and useful, but which is of such a nature that it lends itself readily to concealment and to ornamentation. To this end the cabinet is made so as to have its body portion let into the wall, which is not unusual, and further to have the door of an ornamental and useful character, preferably a mirror, but which is constructed and connected with the cabinet in such a way as to serve well its door functions, and which further is constructed so that when closed it has every appearance of a framed mirror or other ornamental plate lying flat against the wall and carrying no suggestion of the closet or cabinet.

The particular design of the mirror or plate is not important, but it is important to have the structure of the cabinet as a whole of such a nature that the face plate or mirror will be well backed and protected so that it can be conveniently used and can have the appearance of being framed against the wall. This and other important features of construction will appear more fully from the description which follows.

Reference is to be had to the accompanying drawings forming a part of this specification in which similar reference characters indicate corresponding parts in all the views.

Figure 1:
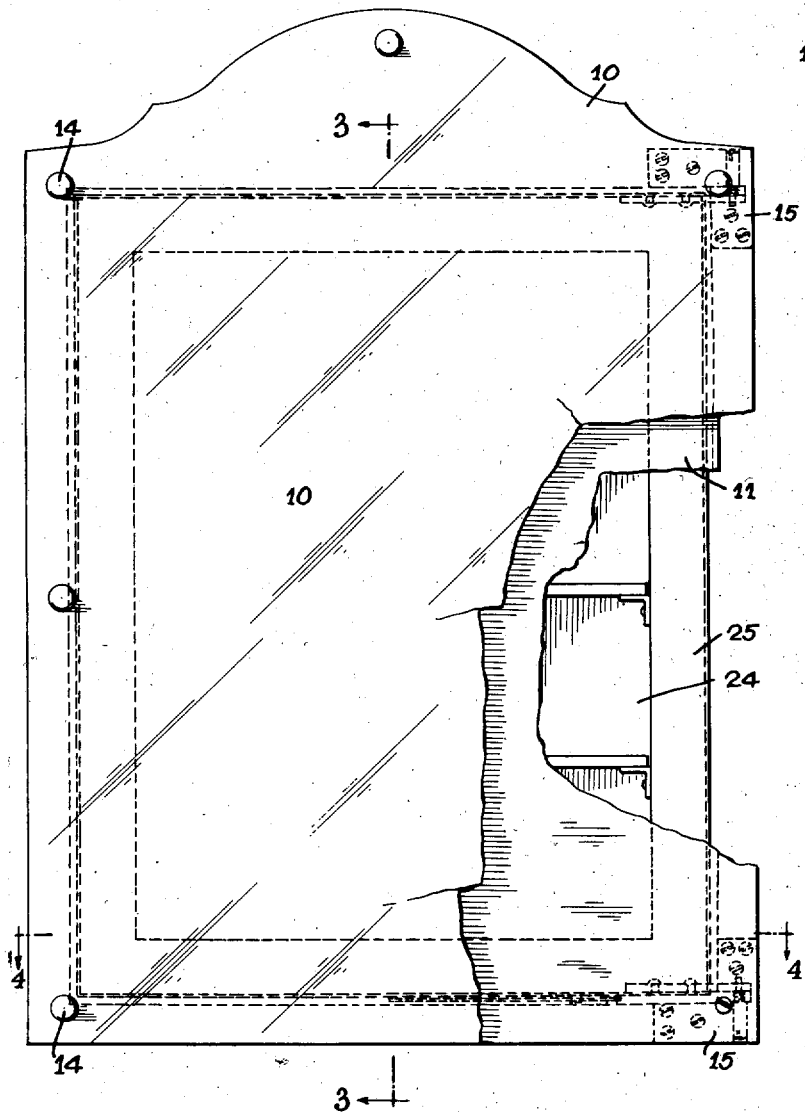
Figure 1 is a broken front elevation of the structure embodying my invention.

The front or door of the cabinet is provided with a plate 10 which is preferably a mirror of glass, and which represents the full face of the door. This is backed by a non-metallic backing 11, preferably a wood panel which fits into a rabbeted portion of a frame 12, preferably of wood, the contour of which corresponds with that of the plate 10. This frame extends all around the back edge portion of the plate 10, and is intended to lie quite close to the adjacent wall and serve as a framing of and protection for the plate 10. There is a small clearance, in practice a fraction of an inch, between the back of the door and the wall, to allow the door to open. The plate can be secured to the frame in any suitable way as, for example, by screws 13 extending through holes in the plate 10 and into the frame 12. The heads of these screws can be covered by ornamental buttons 14 which can be of glass or burnished metal and which add to the appearance of the plate 10.

Figure 2:
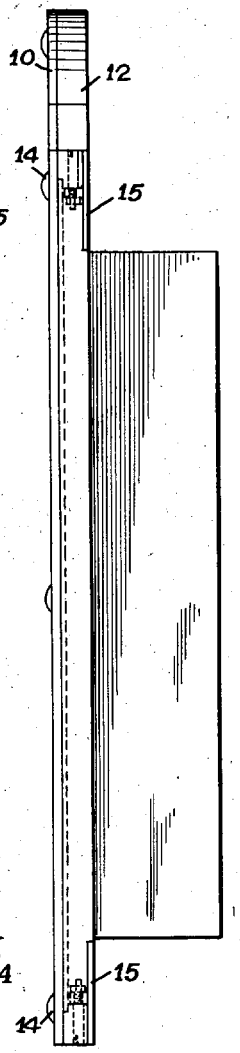
Figure 2 is a side elevation thereof.
Figure 3:
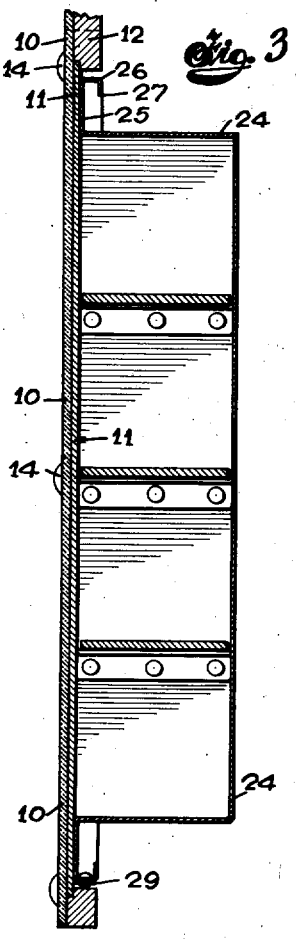
Figure 3 is a vertical section on the line 3—3 of Figure 1.
Figure 5:
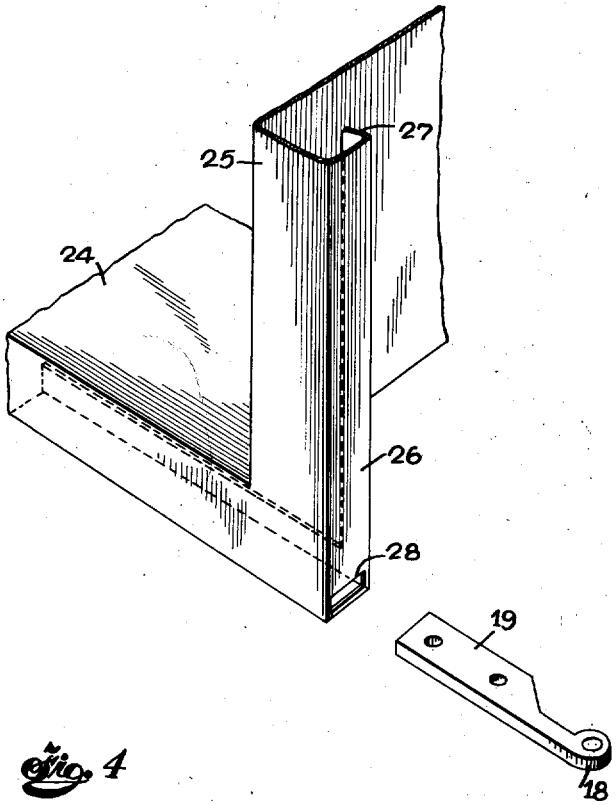
Figure 5 is a broken detail perspective of a corner portion of the cabinet and a part of the hinge.
Figure 8:
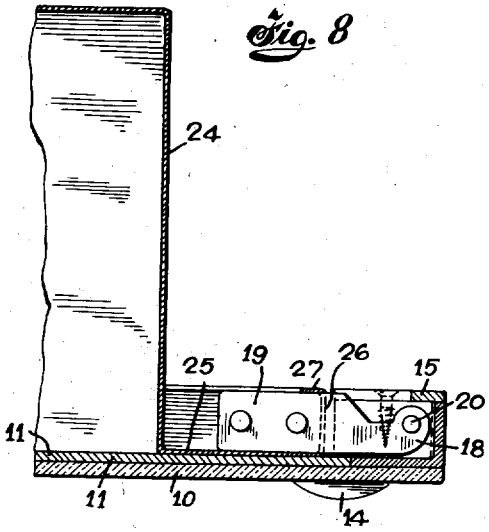
Figure 8 is a section on the line 8—8 of Figure 6.
Figure 10:
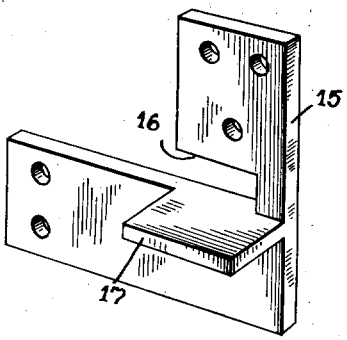
Figure 10 is a detail perspective of one of the corner brackets of the door frame.

The parts 10, 11 and 12 comprise the door of the cabinet and these on the hinged edge and the top and bottom are provided with corner brackets 15 which are preferably let into the woodwork of the frame, as shown in Figure 2, and which serve to stiffen the frame. Obviously similar brackets might be applied to the other two corners of the frame if desired. The brackets are shown in Figure 10 and are provided with slots 16 to accommodate the hinges presently referred to, and extending from the lower wall of the slot and at right angles to the body of each hinge is a ledge 17 which serves as a support for the hinge butt. This has an end portion 18 lying upon the ledge 17 and a body portion 19 which is secured to a flange of the cabinet body as shown in Figure 8 and as presently described.

Figure 7:
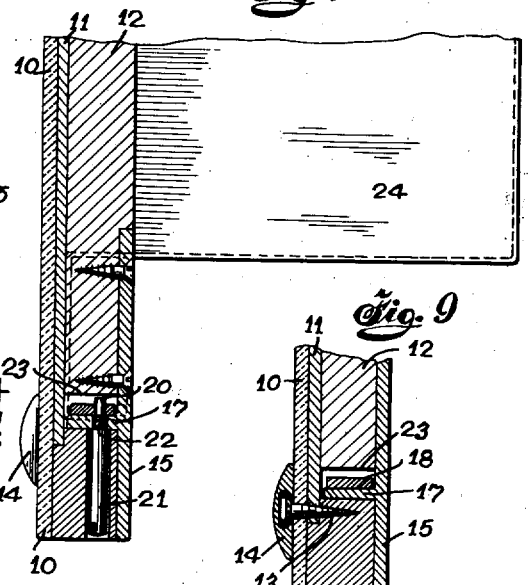
Figure 7 is a section on the line 7—7 of Figure 6.
Figure 9:
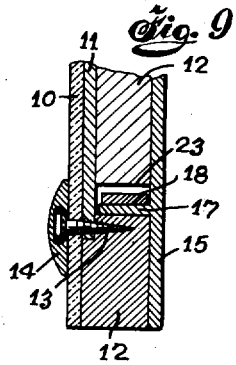
Figure 9 is a detail section on the line 9—9 of Figure 6.

The parts 18 of the hinges are adapted to receive the pintles 20 each of which is formed on a screw member 21 extending through a corresponding opening in the frame 12, and having a part 22 threaded into a hole, Fig. 7, in ledge 17. The frame 12 is cut away as shown at 23 in Figure 9, to provide clearance for the hinges and the ledges 17. The body 24 of the cabinet is the typical box-like structure, so far as its general character is concerned, and it can be fitted with any usual or preferred shelving or the like. It is preferably of sheet metal and has at the front edge a laterally projecting flange 25 extending all the way around the body and this merges into a rearwardly extending flange 26 which in turn is inturned as at 27 so that the flange as a whole comprising the parts 25, 26 and 27, is of generally rectangular shape and forms a frame for the cabinet body which greatly stiffens the body and which also forms a flush abutment against which the panel 11 of the door may close snugly and without injury. The hinge butts 19 can extend through corresponding openings or slots 28 in the vertical parts 26 of the cabinet frame, and the butts are secured to the corresponding upper and lower parts 26 of the frame, so as to firmly fasten and support the hinges. It will be seen that the means described for hanging the door allows the frame 12 to enclose the cabinet frame 25, 26 and 27 so that the edge of the frame 12 shows at the back edge of the mirror frame, while the back of the door closes against the hollow and somewhat springy frame of the cabinet. Thus an effective easy closure is provided for and the beauty of the closed mirror door enhanced. The plane of the opening defined by the front of the box member 24 is substantially flush or co-extensive with the plane of the wall, and the plane of the back of the door is also substantially flush or co-extensive with the plane of the wall, just enough clearances, however, being provided to allow the opening of the door. The door is mounted so that when closed it is as close to the wall as is practicable, whereby the mirror or other independent wall attachment carried by the door appears as if mounted on the wall in the customary way; the fact that the wall attachment is also a door is not apparent.

It is desirable that the door of the cabinet shall not swing wide open, as in such cases the mirror or plate 10 or the adjacent wall might be injured, and to limit the movement of the door any suitable means can be used.

Figure 4:
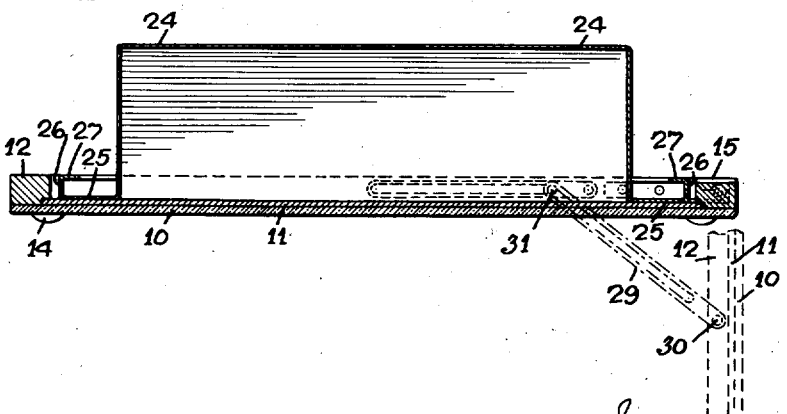
Figure 4 is a sectional plan on the line 4—4 in Figure 1.
Figure 6:
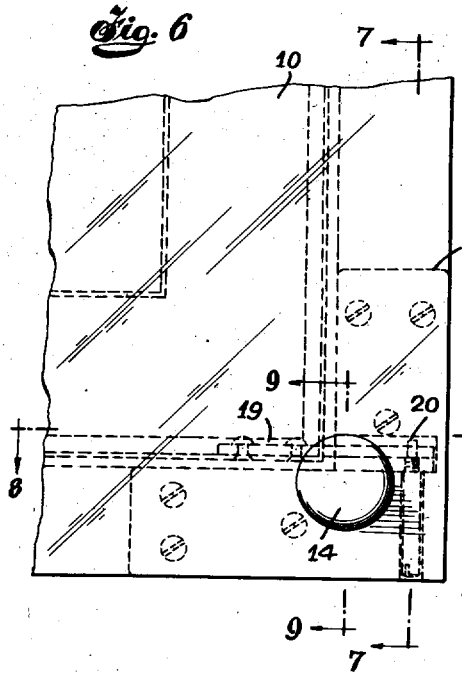
Figure 6 is a broken front view of the corner part of the cabinet illustrating also the hinge connection.

In Figure 4 I have shown in dotted lines a suitable stop comprising a link 29 which is pivoted to a part of the door as shown at 30, which is slotted lengthwise and which connects with a pin 31 on the lower flange member 26 of the cabinet. Thus as the door swings open the link will be pulled out, as illustrated, and will limit the movement of the door, and when the door swings to closed position, the link will lie along the lower flanges 26 of the cabinet.

From the foregoing description it will be seen that the cabinet which I have illustrated and described is of simple but strong construction; that it can be set into the wall so that the outer part will be substantially flush therewith; and that the door is to all appearances an ornamental mirror or plate lying flat against the adjacent wall, and that it can be swung out conveniently to afford access to the inner part of the cabinet.

I claim:

1. A wall cabinet having a box like body adapted to be secured in a reces in a wall, said body having at its open edge portion a hollow laterally extending frame, and a door hinged to the body frame, said door having a face plate and a marginal frame around the back edge of the plate adapted to lie adjacent the wall and enclose the frame of the cabinet body adjacent the box-like body.

2. In a structure of the kind described the combination with a wall cabinet having a marginal flange, of a door having a marginal frame on the back side adapted to lie against a wall, corner brackets on the door frame, each bracket having a supporting ledge thereon, and hinges pivoted to the frame adjacent the ledges and connected to the door the butts of the hinges being supported on the flange of the cabinet.

3. A wall cabinet comprising a box-like body adapted to fit in a wall recess, said body having around its forward edge a flange of general rectangular cross section forming a body frame, and a door having hinges supported on the said frame, the said door comprising a mirror covering the face of the door, a panel behind the mirror arranged to fit against the adjacent frame, and a marginal door frame on the back part of the mirror arranged to lie close to the wall adjacent the box-like body.

4. A wall cabinet, comprising a box-like body adapted to fit in a wall opening, said body having a hollow marginal frame or bead at its outer edge adapted to lie close to the adjacent wall, a door having around its back edge portion a frame fitting around the adjacent bead or frame of the cabinet so that only the edge portions of the door frame are exposed, and a concealed hinge connection between the door frame and the cabinet frame which permits the door to swing free of the adjacent wall.

5. A cabinet for use in a wall recess, comprising a box member adapted to be set into an opening in the wall, with the plane of the front of the box member substantially flush with the surface of the wall, and a door hinged to the box member and of sufficient size to conceal the door hinges and to conceal the box member and wall opening, the door when closed being positioned close to the wall but with sufficient clearance to permit the opening of the door, and having the attributes of an independent ornamental wall attachment.

6. A cabinet for use in a wall recess, comprising a box member adapted to be set in a wall opening with the plane of the front of the box member substantially flush with the surface of the wall, and a door hinged to the box member and of sufficient size to conceal the box member and wall opening, the back of the door when closed being substantially flush with the surface of the wall, just sufficient clearance being provided between the door and wall to permit the opening of the door, said door when closed having the attributes and appearance of an independent ornamental wall attachment.

7. A cabinet for use in a wall recess, comprising a box member adapted to be set into an opening in the wall, and a door hinged to the box member, the said door when closed concealing the door hinges, the box member, and the wall opening, and having the attributes of an independent ornamental wall attachment.

In testimony whereof, I have signed my name to this specification this 14th day of May, 1929.

JOSEPH A. HOEGGER.